United States Patent [19]

Bianco

[11] Patent Number: 4,669,052
[45] Date of Patent: May 26, 1987

[54] APPARATUS AND METHOD FOR CALIBRATING A SENSOR

[75] Inventor: Gerry Bianco, Streamwood, Ill.

[73] Assignee: Motorola, Inc., Schaumburg, Ill.

[21] Appl. No.: 751,341

[22] Filed: Jul. 2, 1985

[51] Int. Cl.$^4$ .................. G01C 25/00; G01F 25/00
[52] U.S. Cl. .................... 364/571; 73/1 R; 364/556
[58] Field of Search ........... 364/557, 558, 571, 559, 364/556; 73/1 R, 3, 4 R

[56] References Cited

U.S. PATENT DOCUMENTS

| | | | |
|---|---|---|---|
| 4,192,005 | 3/1980 | Kurtz | 364/558 X |
| 4,303,984 | 12/1981 | Houvig | 364/571 |
| 4,399,515 | 8/1983 | Gross | 364/571 |
| 4,549,277 | 10/1985 | Brunson et al. | 364/559 |
| 4,562,554 | 12/1985 | Stixrud et al. | 364/557 |

*Primary Examiner*—Errol A. Krass
*Assistant Examiner*—Kevin J. Teska
*Attorney, Agent, or Firm*—Steven G. Parmelee

[57] ABSTRACT

A method and apparatus for calibrating a sensor output that includes a logic unit (11) for receiving uncalibrated sensor signals from a sensor (13) and for receiving data from a data base unit (12) regarding test points that relate to that particular sensor's (13) performance. Based upon these inputs, the logic unit (11) can provide a sensor reading calibrated to a preselected standard.

7 Claims, 8 Drawing Figures

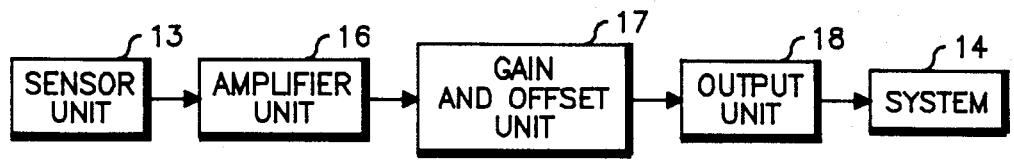
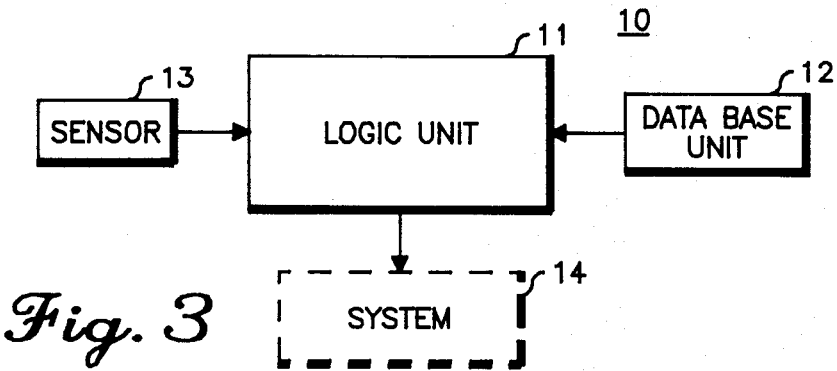
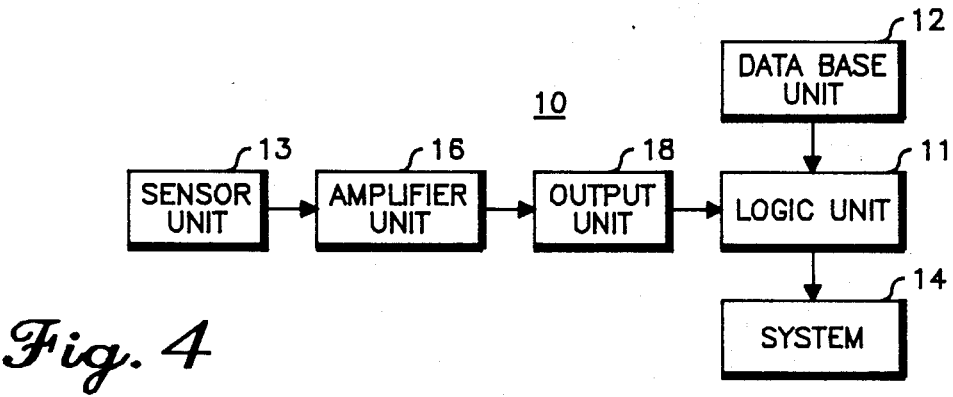
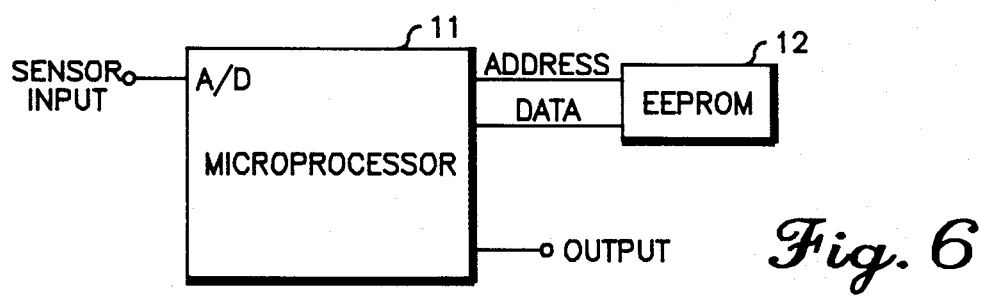

| MEMORY ADDRESS | CONTENTS |
|---|---|
| 00 | 2.0 |
| 01 | 4.68 |
| 02 | .2800 |
| 03 | 3.5 |
| 04 | 5.10 |
| 05 | .2000 |
| 06 | 5.0 |
| 07 | 5.40 |
| 08 | .1480 |
| 09 | 7.5 |
| 0A | 5.77 |
| 0B | .1120 |
| 0C | 10.0 |
| 0D | 6.05 |
| 0E | .1040 |
| 0F | 15.0 |
| 10 | 6.57 |
| 11 | .1140 |
| 12 | 20.0 |
| 13 | 7.14 |
| 14 | .1040 |
| 15 | 30.0 |
| 16 | 8.18 |
| 17 | .0760 |
| 18 | 40.0 |
| 19 | 8.94 |
| 1A | .0570 |

APPARATUS AND METHOD FOR CALIBRATING A SENSOR

TECHNICAL FIELD

This invention relates generally to sensor signal processing and more particularly to the calibration and standardization of sensor outputs.

BACKGROUND ART

Electrically controlled systems often respond, at least in part, to external events. Sensors of various kinds are typically utilized to allow such a system to monitor the desired external events. Such sensors provide predictable electrical responses to specific environmental stimuli. For instance, mass air flow sensors provide an electrical output having an amplitude that varies in response to mass air flow in the vicinity of the sensor.

Sensors are comprised of one or more components, and such components are usually only accurate within some degree of tolerance. As a result, sensors must usually be calibrated prior to installation and use. For instance, mass air flow sensors usually have a gain and offset unit having a number of trim points (such as resistors that can be laser trimmed) to provide a substantially standardized and calibrated output.

Unfortunately, such prior art calibration techniques are relatively costly. There exists a need for a sensor calibration apparatus and method that offers equal or better reliability, durability, accuracy, and cost benefits.

SUMMARY OF THE INVENTION

These needs are substantially met by provision of the apparatus and method for calibrating a sensor output as described herein. Through use of this apparatus and method, trim points and other internal calibration techniques can be eliminated from the sensor. Instead, a data base can be empirically prepared for each sensor to relate that sensor's output to known environmental influences. In addition, to aid the interpolation process, a slope value can also be stored in the data base to indicate the slope between test points.

Pursuant to the invention, a microprocessor or other element capable of performing logic functions receives the sensor output, accesses the data base, and determines a sensor reading in view of the data base information to yield a standardized calibrated output.

BRIEF DESCRIPTION OF THE DRAWINGS

These and other attributes of the invention will become more clear upon making a thorough review and study of the following description of the best mode for carrying out the invention, particularly when reviewed in conjunction with the drawings, wherein:

FIG. 1 comprises a block diagram depiction of a prior art sensor and calibration unit;

FIG. 3 comprises a general block diagram of the invention;

FIG. 4 comprises a block diagram of the apparatus of the invention;

FIG. 6 comprises a block diagram of a microprocessor arrangement suitable for use with the invention;

BEST MODE FOR CARRYING OUT THE INVENTION

Figure 2:
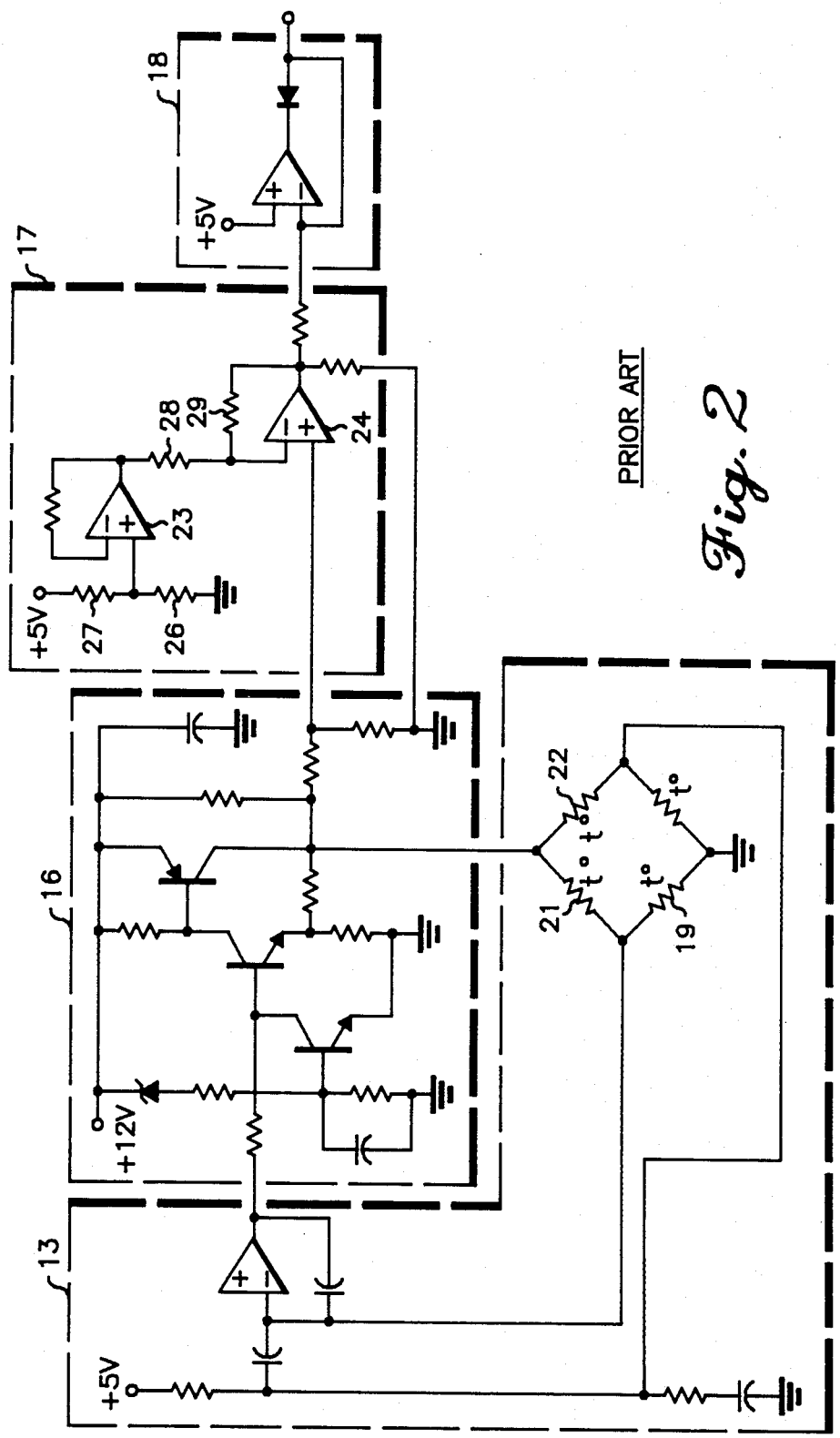
FIG. 2 comprises a schematic diagram of a prior art sensor and calibration unit.

Referring now to the drawings, and in particular to FIG. 3, the apparatus of the invention can be seen as depicted generally by the numeral 10. The apparatus (10) includes generally a logic unit (11) and a data base unit (12) that operate in conjunction with an electronic sensor (13). The data base unit (12) provides storage for test point sensor output values, empirically determined external event values that correspond to the above test points, and slope values between the test point values. The logic unit (11) receives the sensor output from the sensor (13), and accesses the data base unit (12). Based upon these inputs, the logic unit (11) provides an output that constitutes a calibrated sensor reading that can be provided to a system (14) for such use as may be desired.

Prior to explaining the invention in any greater detail, it will be helpful to first understand prior art sensor calibration techniques.

Referring first to FIG. 1, a typical prior art sensor having internal calibration includes generally a sensor unit (13), an amplifier unit (16), a gain and offset unit (17), and an output unit (18). Signals from the sensor unit (13) are first amplified in the amplifier unit (16) and are then subjected to calibration through the gain and offset unit (17). The calibrated signal then proceeds to an output unit (18) where it can be made available to a system (14) as may be desired.

Referring now to FIG. 2, a specific embodiment of a prior art mass air flow sensor incorporating such calibration techniques as described above will be explained.

The mass air flow sensor (13) includes a wheatstone bridge (19) having a thermistor (21) to provide temperature compensation and a hot foil resistive component (22) for responding to the flow of air in the immediate vicinity of the sensor (13). The bridge signals are processed and then provided to an amplifier unit (16) that serves to boost the sensor signal. Following this, a gain and offset unit (17) provides two operational amplifiers (23 and 24) and a number of resistors, including 4 resistors (26, 27, 28, and 29) that are subjected to laser trimming during manufacture of the device, to allow accurate adjustments to be made to the raw amplified sensor signal to ensure a calibrated and standardized output.

The output unit (18) essentially comprises a 5 volt clamp as depicted. The output of the output unit (18) can then be directed as desired.

Referring now to FIG. 4, a somewhat more detailed block diagram of the apparatus (10) of the invention will be described.

As with the prior art system described above, a sensor unit (13) provides a raw sensor signal to an amplifier unit (16) for amplification. Unlike the prior art device, however, the amplified sensor signal is not then subjected to processing through a gain and offset unit (17). Rather, the signal proceeds directly through an output unit (18) to the logic unit (11) referred to above. Based upon this input and upon the information contained in the data base unit (12), the logic unit (11) then provides a calibrated sensor reading for use as desired.

Figures 5, 7:
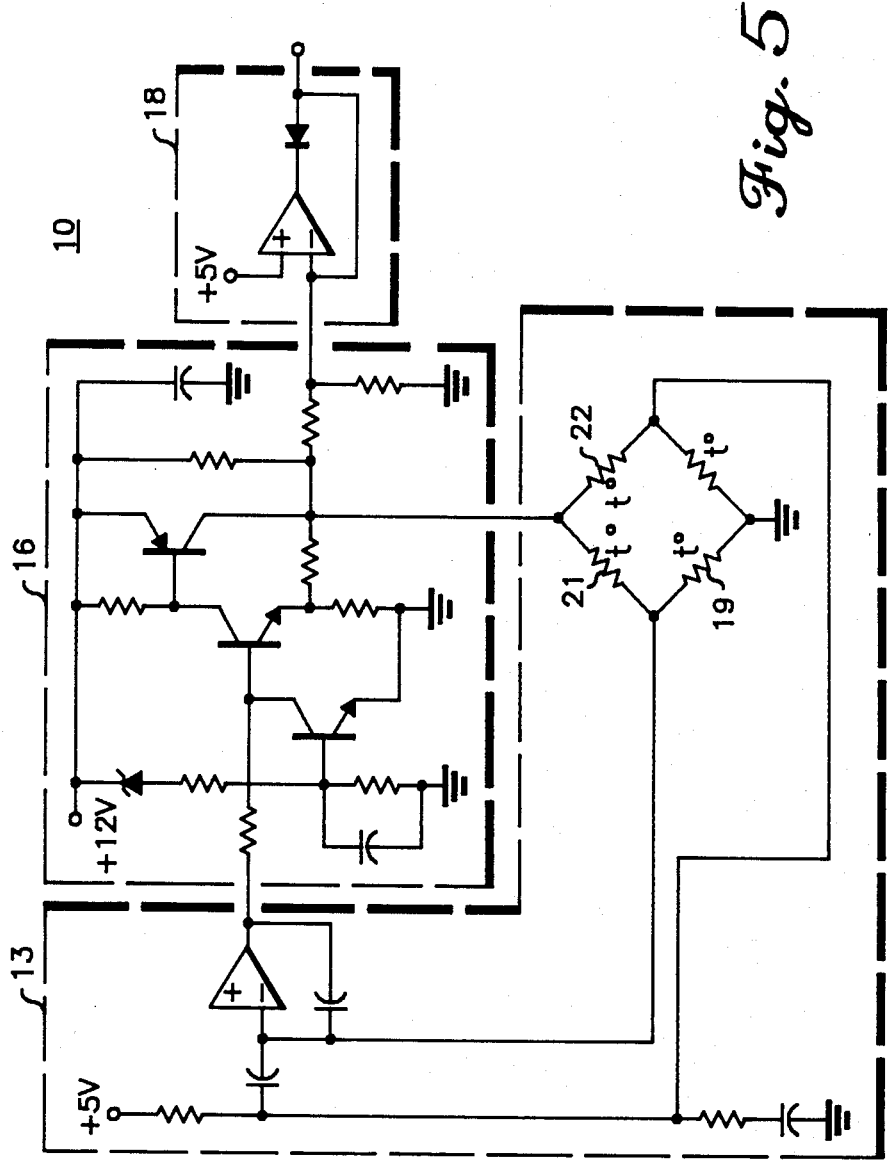
FIG. 5 comprises a schematic diagram of the apparatus of the invention.
FIG. 7 comprises an example of a data base that may be used in conjunction with the invention.

Referring now to FIG. 5, a more specific description of the apparatus (10) of the invention will be described.

As can be seen by comparing FIGS. 5 and 2, the apparatus (10) of this particular embodiment of a mass air flow sensor appears substantially identical to the prior art device, with the exception of the absence of the gain and offset unit (17). Instead, the output of the amplifier unit (16) connects directly to the output unit (18). With the exception of this difference, the circuit depicted operates identically to the prior art circuit.

Referring to FIG. 6, the output of the output unit (18) can be connected to the analog to digital input of a microprocessor that serves as the logic unit (11) in this embodiment. The microprocessor may also be connected to an EEPROM that serves as the data base unit (12) in this embodiment. Finally, an output port of the microprocessor can serve as the logic unit output that provides the calibrated sensor signal output.

In order to operate properly, the data base unit (12) must have an appropriate collection of data regarding sensor (13) performance. Such information can be empirically established for each individual sensor (13) by sequentially exposing each sensor (13) to a number of known external events of known magnitudes. The sensor output at each test point can be measured and this information retained as a test point sensor output value. As many test points can be taken over as broad a range as desired to achieve the output resolution desired.

An example of a data base containing such information can be seen in FIG. 7. The figures depicted reflect test point data for a mass airflow sensor. The first memory address (00) and every third memory address thereafter (i.e., 03, 06, 09, etc.) contain the value of the external event exposed to the sensor at that test point. For instance, at memory address 00, 2.0 grams per second of air were passed by the sensor (13) during the relevant time period. At memory address 03, 3.5 grams per second were similarly exposed, and so forth.

The following memory address contains the actual sensor output obtained at that test point. For instance, at 2.0 grams per second, memory address 01 indicates that the sensor (13) in question provided an output of 4.68 volts. At 3.5 grams per second, the sensor had an output of 5.10 volts, and so forth.

In addition, as an aid to interpolation, slope values relating to the slope between test points (viewed as a function of external event values versus sensor output value) can be calculated and stored in an appropriate manner. For instance, at memory address 02, a slope of 0.2800 volts-seconds per grams comprises the slope between the first test point and the second test point.

It can therefore be noted that in the data base described above, test point data can be stored in groups of three in a sequential manner. It would of course be possible to store such information in a random fashion as well, but the arrangement depicted would allow the use of a logic unit (11) having only remedial memory access capabilities.

Figure 8:
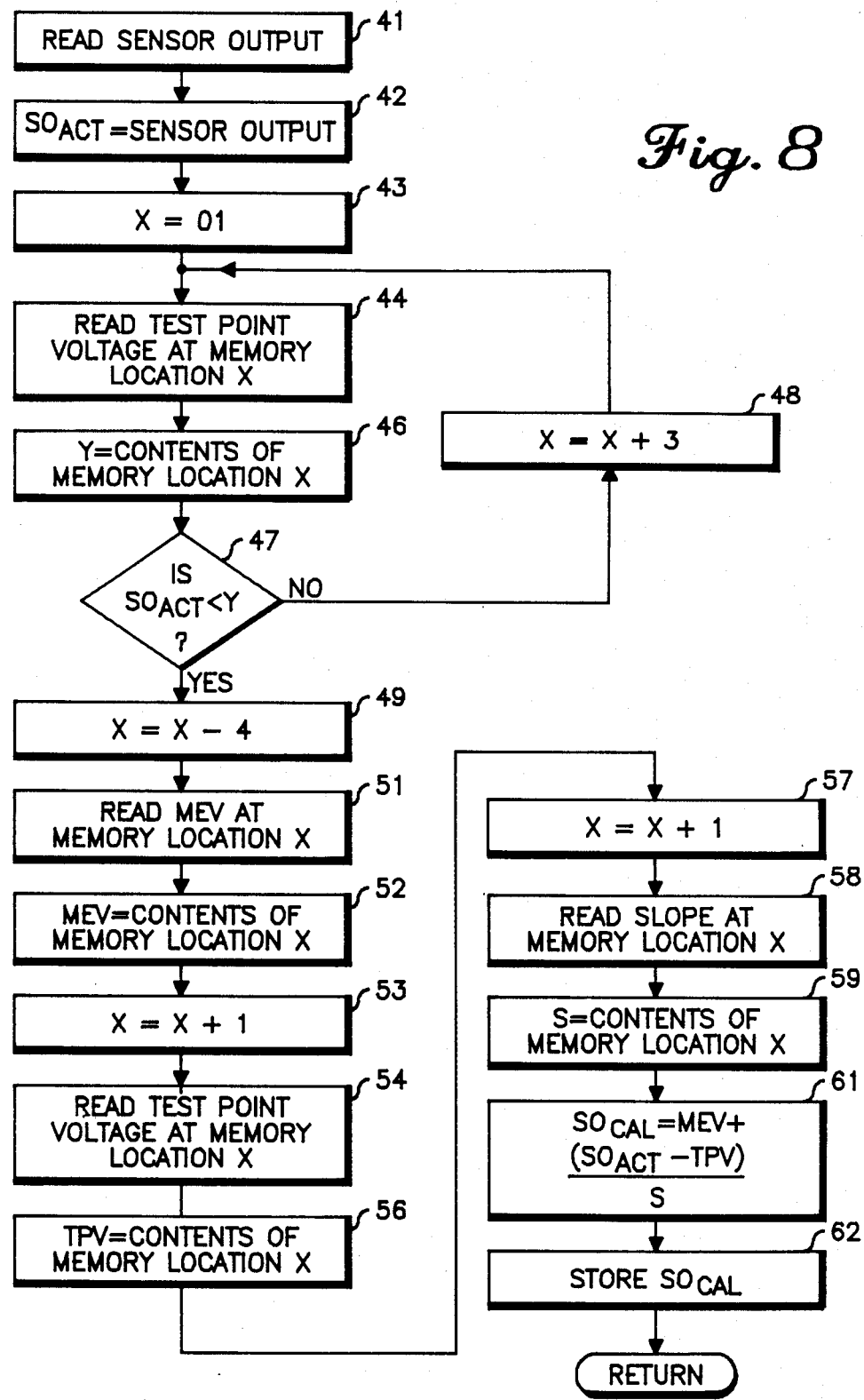
FIG. 8 comprises a flow chart of a method of modifying the sensor signal output to yield a calibrated output.

Referring now to FIG. 8, a flow chart of a program that could be utilized in a microprocessor comprising the logic unit (11) (or as otherwise implemented in a logic network) to effectuate the method of the invention will now be described. For purposes of example, the sensor unit (13) will be presumed to be a mass air flow sensor.

The method begins by receiving or reading the actual uncalibrated sensor output ($SO_{act}$)(41) and storing it (42). For purposes of example, let it be presumed that the uncalibrated sensor output ($SO_{act}$) has a value of 4.85 volts. Next, working variable X has the value 01 assigned to it (43). Following this, the contents of the data base unit (12) are accessed, with memory location 01 being referred to first (44). Referring to FIG. 7, this particular memory address has the value of 4.68 stored in it, and this value is assigned to working variable Y (46).

The process then determines whether the sensor output ($SO_{act}$) is less than the last referred to memory contents (Y) (47). In the example provided, the sensor output of 4.85 volts exceeds the stored test point value of 4.68 volts. The process would therefore increment the variable X by 3 (48) and repeat the data base accessing steps just described (44 and 46) until the recalled test point exceeds the sensor output value (47).

When the latter condition finally results, variable X will be decremented by 4 (49) and the memory location identified by variable X will be read. The contents of this memory location will be stored as the value of the monitored event (MEV) that corresponds to the located test point value (51 and 52).

Following this, variable X will be incremented by 1 (53) and the test point voltage (TPV) stored at this location will be read (54) and stored (56). Next, variable X will again be incremented by 1 (57), and the contents of the memory location at that point read (58) and stored (59) as the slope (S) corresponding to those two test points between which the sensor output falls.

With the above data identified, a calibrated and standardized mass airflow reading (MAF) will be calculated pursuant to the following equation:

$$MAF = MEV + \frac{(SO_{act} - TPV)}{S}$$

The result can then be stored or passed on for use by the system as desired (61 and 62).

Pursuant to use of this apparatus and method, simple and relatively inexpensive sensors can be manufactured without regard for internal calibration provisions. Despite the use of inexpensive sensors, very accurate and perdictable results can be obtained through use of the calibration and standardization method and apparatus disclosed herein.

Those skilled in the art will appreciate that many variations could be practiced with respect to the above described invention without departing from the spirit of the invention. Therefore, it should be understood that the scope of the invention should not be considered as limited to the specific embodiment described, except in so far as the claims may specifically include such limitations.

What is claimed is:

1. A method of providing a calibrated reading for an electronic sensor, the electronic sensor providing sensor output signals in response to external events, the method comprising the steps of:
    (a) providing data base means for storing:
        (i) a plurality of test point sensor output signal values;
        (ii) a plurality of values for said external event, at least some of said external event values corresponding to at least some of said test point sensor output values; and
        (iii) a plurality of slope values representing slopes between various of said test point values, at least one of said slope values corresponding to at least some of said test point sensor output values;

(b) providing logic means for providing said calibrated reading, said logic means having access to said data base means;

(c) providing said sensor output signal from said electronic sensor to said logic means;

(d) comparing, in said logic means, said sensor output signals with at least one of said stored test point sensor output signal values to locate a stored test point sensor output signal value having a predetermined relationship with respect to said sensor output signal;

(e) locating in said data base means said value for said external event that corresponds to said located test point sensor output signal value and a slope value that corresponds to said located test point sensor output signal value;

(f) calculating a calibrated sensor reading by making use of said located value of said external event and said located slope value; and (g) providing said calibrated sensor reading as a calibrated reading for said electronic sensor.

2. The method of claim 1 wherein said predetermined relationship set forth in step d requires that said located stored test point sensor output signal value satisfy both of the following two conditions:

(i) the stored test point sensor output signal value is less in value than said sensor output signal; and (ii) the stored test point sensor output signal value is larger in value than any of the other stored test point sensor output signal values that are also less in value than said sensor output signal.

3. The method of claim 1 wherein step f provides for calculating said calibrated sensor reading in accordance with the following equation:

$$MAF = MEV + \frac{(SO_{act} - TPV)}{S}$$

wherein:

(i) MAF = calibrated sensor reading;

(ii) MEV = value of external event that corresponds to the located test point value;

(iii) $SO_{act}$ = actual sensor output;

(iv) TPV = the located test point value;

(V) S = the slope that corresponds to the located test point value.

4. The method of claim 3 wherein each one of said stored external event values corresponds to one each of said stored test point sensor output signal values.

5. The method of claim 4 wherein each one of said stored slope values corresponds to one each of said stored test point sensor output signal values.

6. The method of claim 1 wherein each one of said stored external event values corresponds to one each of said stored test point sensor output signal values.

7. A calibration device for use with an electronic sensor that provides substantially predictable sensor outputs in response to a monitored external event, the device comprising:

(a) data base means for storing:

(i) a plurality of test point sensor output values for that specific electronic sensor with which the calibration device will be used;

(ii) a plurality of values for said external event, each one of said external event values corresponding to one of each of said test point sensor output values; and (iii) a plurality of slope values representing slopes between various of said test point values, with one of each of said slope values corresponding with one of each of said test point sensor output values; and (b) logic means connected to said electronic sensor for receiving said sensor outputs and further being connected to said data base means for accessing said plurality of test point sensor output values, said plurality of values for said external event, and said plurality of slope values for providing an output that comprises a calibrated reading for said electronic sensor that is standardized to a preselected standard.

* * * * *